Figure 1:
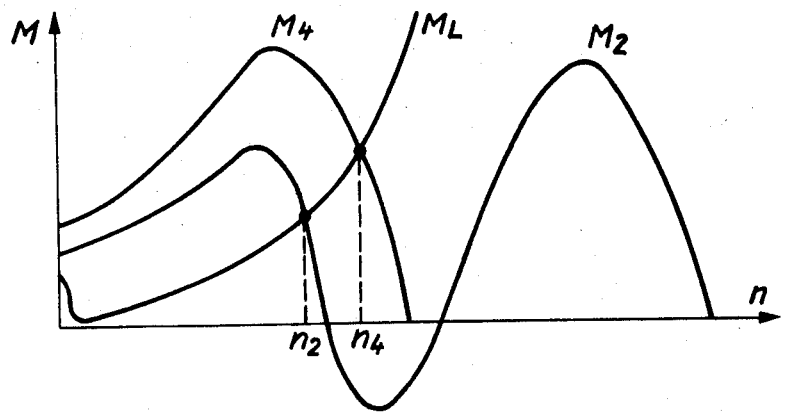

Dec. 16, 1958 P. VASKE 2,864,987
POLE CHANGING SHADED POLE MOTOR
Filed April 7, 1958

*Inventor:*
PAUL VASKE
By: Toulmin & Toulmin
ATTORNEYS

United States Patent Office 2,864,987
Patented Dec. 16, 1958

2,864,987

POLE CHANGING SHADED POLE MOTOR

Paul Vaske, Oldenburg, Germany, assignor to Licentia Patent-Verwaltungs-G. m. b. H., Hamburg, Germany Application April 7, 1958, Serial No. 726,679

Claims priority, application Germany April 5, 1957

2 Claims. (Cl. 318—223)

The present invention relates to single phase induction motors. More in particular, the present invention relates to shaded pole motors in which only one half of the poles opposite each other is provided with a winding and in which the number of operating poles is changed by switching the exciting coils from excitement in the same direction to excitement in opposite directions.

Shaded pole motors of the type referred to are known in the art. There are also known shaded pole motors which are capable of operation at two greatly different speeds, i. e., a comparatively low and a great speed. This is achieved in the manner described, for example, in the German Patent 635,462. With excitation of the pairs of poles in the same direction, the covered area of the excited poles is brought into a predetermined ratio to the covered area of the non-excited poles. However, this construction is not susceptible to switch the motor at will from one speed to the other speed.

It is also known to provide a double-n-pole shaded pole motor, in which every pole is provided with a winding and which can be converted to a pole-changing motor by being operated first as a shaded pole motor and then as an n-pole capacitor-auxiliary phase motor (see German Patent 940,919). The ratio of speed is approximately in the order of 1 : 2. This construction is unsatisfactory, as it requires an additional capacitor and it is therefore unduly complicated and expensive.

All these known motors are not suitable for impelling a ventilator in which the change from operation with a predetermined number of poles to operation with another number of poles is to determine the speed or number of revolutions and in which the ratio of the two speeds or revolutions per time unit is to be in the order of 3 : 2. In the ordinary shaded pole motor the change of speeds can be accomplished by providing a series resistance or by tapping the winding. However, the speed then depends to a very great extent on the applied load and the supplied voltage, and therefore lacks the desired optimal degree of stability.

The known pole changing shaded pole motors are thus unsatisfactory, particularly for use in ventilators.

Accordingly, it is an object of the present invention to provide a pole changing shaded pole motor which is particularly useful for operating ventilators.

It is another object of the present invention to provide a pole changing shaded pole motor, particularly for operating ventilators, which is susceptible to operation at different speeds and which can be switched at will from operation at one speed to operation at another speed.

It is a further object of the present invention to provide a pole changing shaded pole motor, particularly for operating ventilators, which is comparatively simple and does not require capacitor means.

It is still another object of the present invention to provide a pole changing shaded pole motor, particularly for operating ventilators, in which the speed or number of revolutions per time unit is comparatively independent from the load applied and the voltage supplied to the motor.

These objects are achieved by the pole changing shaded pole motor of the present invention of the type having a 2-n-polar stator frame in which only every second pole bears an exciting coil and susceptible to n-polar and 2-n-polar excitement, in which the stator frame is so constructed that in the case of n-polar excitement a pronounced third field harmonic is created maintaining the number of revolutions per time unit of the ventilator at about two thirds of the number of revolutions in the case of two n-polar excitement.

In view of the fact that during the n-polar excitement the input is greater than during the two n-polar excitement and because of the inferior cooling due to the smaller number of revolutions, the motor will not be utilized to its fullest possible extent during the 2-n-polar excitement. This disadvantage is eliminated by a further feature of the present invention providing a series resistance switched in during the n-polar excitement. This series resistance can, of course, be much smaller than the resistance required in the known shaded pole motor in which a series resistance controls the number of revolutions. Furthermore, in view of the shunt characteristics, the stability of speed or number of revolutions per time unit is considerably greater than in the known constructions.

Figure 2:
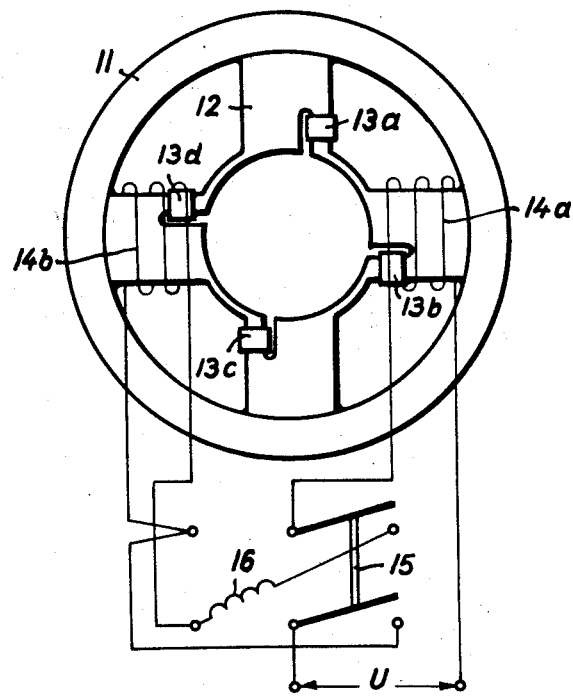

The invention is illustrated in the accompanying drawings wherein Figure 1 is a diagram showing the characteristic curves of the torque-number of revolutions per time unit of the shaded pole motor of the present invention;

Figure 2 is a sectional view of the stator in the shaded pole motor of the present invention.

Figure 2 shows the stator comprising the yoke ring 11 in the stator pole frame 12. The stator pole frame 12 bears four shading coils 13a, 13b, 13c, 13d and two exciting coils 14a, 14b. The voltage is supplied to the exciting coils 14a, 14b, via the staircase switch 15. In the staircase switch arrangement there is provided the series resistance 16.

Whenever the staircase switch 16 is set rightwardly, the coils 14 are switched via the resistance 14 to operate in the same direction and the motor operates with two poles. If the staircase switch 15 is set leftwardly, the coils 14 will operate in opposite directions and a quadripolar field is created.

In the diagram of Figure 1, $M_2$ designates the characteristics of the torque-number of revolutions or speed of the motor in the case of bi-polar operation. The point of intersection of the characteristic curve $M_2$ with the ventilator characteristic $M_L$ indicates the number of revolutions $n_2$ which is in the order of 900 revolutions p./min.

If the motor operates with four coils, the characteristic curve of the torque-number of revolutions is as indicated by the line $M_4$. The point of intersection of this curve with the ventilator characteristic $M_L$ indicates the number of revolutions $M_4$ which is in the order of about 1,300 revolutions p./min.

It will be understood that this invention is susceptible to modification in order to adapt it to different usages and conditions, and, accordingly, it is desired to comprehend such modifications within this invention as may fall within the scope of the appended claims.

What I claim is:

1. A pole changing shaded pole motor comprising a 2-n-polar stator, a plurality of poles and a plurality of exciting coils provided on every second of said poles, switch means adapted to switch the motor from n-polar excitement to 2-n-polar excitement and vice versa, and a series resistance adapted to be connected with said exciting coils by said switch means during n-polar excitement, said stator being adapted to create a pronounced third field harmonic during n-polar excitement maintaining the speed of said motor at substantially two thirds of the speed during 2-n-polar excitement.

2. A pole changing shaded pole motor as described in claim 1, with said switch means consisting of a staircase switch.

No references cited.